US010484259B2

United States Patent
Gao et al.

(10) Patent No.: US 10,484,259 B2
(45) Date of Patent: Nov. 19, 2019

(54) PACKET LOSS LOCATING IN VXLAN

(71) Applicant: NEW H3C TECHNOLOGIES CO., LTD, Hangzhou, Zhejiang (CN)

(72) Inventors: Ruichang Gao, Beijing (CN); Yan Qiao, Beijing (CN); Neng Yan, Beijing (CN); Chen Miao, Beijing (CN)

(73) Assignee: NEW H3C TECHNOLOGIES CO., LTD, Hangzhou (CN)

( * ) Notice: Subject to any disclaimer, the term of this patent is extended or adjusted under 35 U.S.C. 154(b) by 0 days.

(21) Appl. No.: 15/743,192

(22) PCT Filed: Jul. 8, 2016

(86) PCT No.: PCT/CN2016/089345
§ 371 (c)(1),
(2) Date: Jan. 9, 2018

(87) PCT Pub. No.: WO2017/008690
PCT Pub. Date: Jan. 19, 2017

(65) Prior Publication Data
US 2018/0205623 A1    Jul. 19, 2018

(30) Foreign Application Priority Data
Jul. 10, 2015    (CN) .......................... 2015 1 0406748

(51) Int. Cl.
*H04L 12/26* (2006.01)
*H04L 12/46* (2006.01)
(Continued)

(52) U.S. Cl.
CPC ...... *H04L 43/0829* (2013.01); *H04L 12/4633* (2013.01); *H04L 12/4641* (2013.01);
(Continued)

(58) Field of Classification Search
None
See application file for complete search history.

(56) References Cited

U.S. PATENT DOCUMENTS 8,619,588 B2    12/2013  Karacali-Akyamac
2003/0214913 A1*  11/2003  Kan .................. H04L 43/08
                                                    370/252
(Continued)

FOREIGN PATENT DOCUMENTS

CN    1972219 A      5/2007
CN    101166122 A    4/2008
(Continued)

OTHER PUBLICATIONS

Alizedeh et al., CONGA: Distributed Congestion-Aware Load Balancing for Datacenters. SIGCOMM'14, pp. 503-514, Aug. 17-22, 2014.
(Continued)

*Primary Examiner* — Candal Elpenord
(74) *Attorney, Agent, or Firm* — McCarter & English, LLP; Kia L. Freeman; Thomas F. Foley

(57) ABSTRACT

A first VXLAN Tunnel End Point (VTEP) determines a simulation packet for simulating a service forwarding path of a service packet forwarded from a first Virtual Machine (VM) accessing the first VTEP to a second VM accessing a second VTEP when the service packet sent by the first VM does not reach the second VM. A packet character parameter of the simulation packet is the same as a packet character parameter of the service packet. The first VTEP calculates the packet character parameter of the simulation packet to determine a User Datagram Protocol (UDP) source port number, performs VXLAN encapsulation for the simulation packet according to the determined UDP source port number and a VXLAN tunnel identity in a local register entry matching with the simulation packet, and forwards the
(Continued)

simulation packet with the VXLAN encapsulation via a VXLAN tunnel corresponding to the VXLAN tunnel identity.

14 Claims, 4 Drawing Sheets

(51) Int. Cl.
*H04L 29/06* (2006.01)
*H04L 12/715* (2013.01)

(52) U.S. Cl.
CPC .......... *H04L 45/64* (2013.01); *H04L 63/0272* (2013.01); *H04L 63/101* (2013.01)

(56) References Cited

U.S. PATENT DOCUMENTS

| | | |
|---|---|---|
| 2011/0096836 A1 | 4/2011 | Einarsson |
| 2011/0249574 A1 | 10/2011 | Karacali-Akyamac |
| 2012/0269086 A1 | 10/2012 | Yue et al. |
| 2014/0059111 A1* | 2/2014 | Veeraiyan ............... H04L 67/02 709/201 |
| 2014/0123211 A1* | 5/2014 | Wanser ................... H04L 63/10 726/1 |
| 2015/0009992 A1* | 1/2015 | Zhang ................... H04L 49/354 370/392 |
| 2015/0103679 A1* | 4/2015 | Tessmer .............. H04L 43/0811 370/252 |
| 2015/0215189 A1* | 7/2015 | Lim .................... H04L 12/4633 370/252 |
| 2016/0112481 A1* | 4/2016 | Pani .................... H04L 12/4633 370/390 |

FOREIGN PATENT DOCUMENTS

| | | |
|---|---|---|
| CN | 101640629 A | 2/2010 |
| CN | 102118277 A | 7/2011 |
| CN | 102546243 A | 7/2012 |
| CN | 103580953 A | 2/2014 |
| CN | 104601472 A | 5/2015 |
| EP | 1555788 A1 | 7/2005 |
| EP | 2289249 A1 | 3/2011 |

OTHER PUBLICATIONS

Argyraki et al., Providing Packet Obituaries. 6 pages, (2004).
Handigol et al., I Know What Your Packet Did Last Flop: Using Packet Histories to Troubleshoot Networks. 11th USENIX Symposium on Networked Systems Design and Implementation. pp. 71-85, Apr. 2-4, 2014.
Handigol et al., Where is the Debugger for my Software-Defined Network? HotSDN'12. pp. 55-60, Aug. 13, 2012.
Jain et al., Generic Overlay OAM and Datapath Failure Detection draft-jain-nvo3-overlay-oam-03. NVO3, Internet—Draft, Intended status: Standards Track. 38 pages, Mar. 6, 2015.
Onoue et al., Host-based Multi-tenant Technology for Scalable Data Center Networks. ANCS'12. pp. 87-98. Oct. 29-30, 2012.
Zeng et al., Automatic Test Packet Generation. Co-NEXT'12. pp. 241-252, Dec. 10-13, 2012.
Gao, et al., Locating TCP packet loss, Computer Engineering and Applications, 49(15) (2013).

\* cited by examiner

PACKET LOSS LOCATING IN VXLAN

RELATED APPLICATIONS

This application is a 35 U.S.C. § 371 national stage filing of International Application No. PCT/CN2016/089345, filed on Jul. 8, 2016, which claims priority of Chinese Patent Application No. 201510406748.6, filed on Jul. 10, 2015. The entire contents of each of the foregoing applications are incorporated herein by reference.

BACKGROUND

Virtual eXtensible Local Area Network (VXLAN) adopts a technology in which a layer 2 packet is encapsulated according to a layer 3 protocol. For example, an outer tunnel with a User Datagram Protocol (UDP) format is used as a data path layer, and packet data are transmitted as payloads.

Since the outer layer of the payloads adopts UDP transmission, the payloads can be transmitted in a layer 2 network and a layer 3 network fluently, so that the layer 2 network may cover the layer 3 network. A covering virtual network is called an overlay network, and a covered physical bearer network is called an underlay network.

DETAILED DESCRIPTION

The terms "first" and "second" described in the specification, the claims and the accompanying drawings are used to distinguish similar objects, but are not used to describe a specific order. The "first" and "second" may be exchanged in some embodiments, and thus these embodiments may be implemented in an executing order different from those of the embodiments described herein.

The solution of the present disclosure will be illustrated with reference to the accompanying drawings and some examples.

Figure 1:
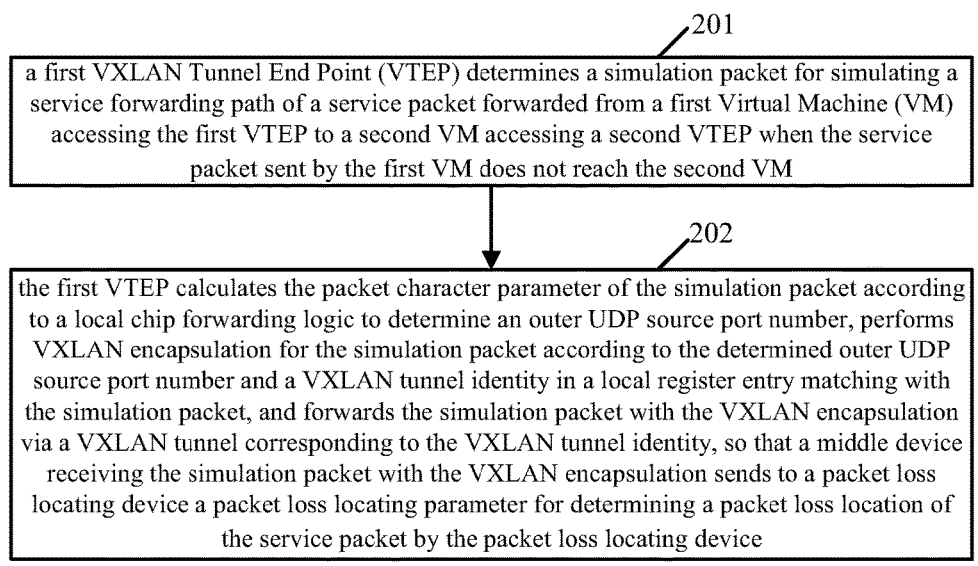
FIG. 1 is a flowchart illustrating a packet loss locating method applied to a VXLAN according to some examples of the present disclosure.

FIG. 1 is a flowchart illustrating a packet loss locating apparatus applied to a VXLAN according to some examples of the present disclosure. As shown in FIG. 1, the method includes following blocks.

At block 201, a first VXLAN Tunnel End Point (VTEP) determines a simulation packet for simulating a service forwarding path of a service packet forwarded from a first Virtual Machine (VM) accessing the first VTEP to a second VM accessing a second VTEP when the service packet sent by the first VM does not reach the second VM, and a packet character parameter of the simulation packet is the same as a packet character parameter of the service packet.

In some examples, the first VTEP, the second VTEP, the first VM and the second VM are named for convenience of description.

In some examples, the packet character parameter of the simulation packet is the same as the packet character parameter of the service packet that is sent by the first VM and does not reach the second VM. The packet character parameter may be a packet five-tuple or a packet seven-tuple. The packet five-tuple includes a destination IP address, a source IP address, a destination port number, a source port number and a protocol type, and the packet seven-tuple includes a destination IP address, a source IP address, a destination MAC address, a source MAC address, a destination port number, a source port number and a protocol type.

In some examples, the service packet contains payloads and the simulation packet does not contain payloads.

At block 202, the first VTEP calculates the packet character parameter of the simulation packet according to a local chip forwarding logic to determine an outer UDP source port number, performs VXLAN encapsulation for the simulation packet according to the determined outer UDP source port number and a VXLAN tunnel identity in a local register entry matching with the simulation packet, and forwards the simulation packet with the VXLAN encapsulation via a VXLAN tunnel corresponding to the VXLAN tunnel identity, so that a middle device receiving the simulation packet with the VXLAN encapsulation sends to a packet loss locating device a packet loss locating parameter for determining a packet loss location of the service packet by the packet loss locating device.

The UDP source port number of an outer UDP header in the VXLAN encapsulation is obtained by the first VTEP through calculating a packet character parameter (for example, a destination IP address of a packet) of the packet according to the local chip forwarding logic. The chip forwarding logic is set by a chip manufacturer and is usually not published. Accordingly, in some examples, in order to simulate the service forwarding path from the first VM to the second VM, the first VTEP may process the simulation packet using the same processing mode as that used for the service packet. As described at block 202, the first VTEP may forward the simulation packet according to the same forwarding logic as that used for the service packet. Since the packet character parameter of the simulation packet is the same as the packet character parameter of the service packet, the UDP source port number of the outer UDP header that is obtained by the first VTEP through calculating the packet character parameter of the simulation packet according to the local forwarding logic is the same as a UDP source port number of an outer UDP header that is calculated for the service packet.

In some examples, the VXLAN tunnel identity in the register entry matching with the simulation packet is a VXLAN tunnel identity corresponding to the VXLAN tunnel via which the first VTEP sends the service packet. In this case, the simulation packet and the service packet can be forwarded via the same VXLAN tunnel, thereby simulating the service forwarding path of the service packet. In some examples, the register entry matching with the simulation packet includes an Access Control List (ACL) entry, and matching items in the ACL entry include the packet character parameter of the simulation packet and an identity of the simulation packet. In order to avoid that the calculation of the UDP source port number is influenced, the location of the identity of the simulation packet in the simulation packet is different from the location of the packet character parameter of the simulation packet in the simulation packet. A processing action in the ACL entry includes assigning the VXLAN tunnel identity to the simulation packet.

In a VXLAN, there is usually a controller for managing VTEPs. When there is a controller in the VXLAN, the packet loss locating device may be the controller for managing VTEPs in the VXLAN.

In some examples, when the packet loss locating device is the controller, the process of the first VTEP determining the simulation packet for simulating the service forwarding path of the service packet forwarded from the first VM to the second VM includes that the first VTEP receives from the controller the simulation packet for simulating the service forwarding path of the service packet forwarded from the first VM to the second VM.

When the packet loss locating device is the controller, the local register entry matching with the simulation packet is generated and sent to the first VTEP by the controller when the controller determines that the service packet sent by the first VM does not reach the second VM.

In some examples, when the controller is the packet loss locating device, the first VTEP may be a single device or a stack device aggregated across devices.

When the first VTEP is a single device, the controller can determine that it is from the first VTEP that the service packet is sent out because the controller has global network topology information, and thus may send the simulation packet and the register entry matching with the simulation packet to the first VTEP.

When the first VTEP is a stack device aggregated across devices, the controller is unable to learn which member device in the stack device receives the service packet. When different member devices receive the service packet, service forwarding paths may be different. Accordingly, the controller is necessary to obtain the number of member devices forming the stack device through interacting with the stack device, and obtain a device identity of each member device, e.g., a slot number. Accordingly, the process of the first VTEP receiving from the controller the simulation packet for simulating the service forwarding path of the service packet forwarded from the first VM to the second VM may be implemented through any one of following two modes.

In a first mode, the controller sends to each member device in the first VTEP the simulation packet for simulating the service forwarding path of the service packet forwarded from the first VM to the second VM. The simulation packet sent by the controller to each member device contains the device identity of the member device besides the packet character parameter. For example, when the first VTEP includes member devices 1-3, the simulation packet sent by the controller to the member device 1 contains the device identity of the member device 1 besides the packet character parameter, the simulation packet sent by the controller to the member device 2 contains the device identity of the member device 2 besides the packet character parameter, and the simulation packet sent by the controller to the member device 3 contains the device identity of the member device 3 besides the packet character parameter.

In the first mode, the location of the device identity in the simulation packet is different from the location of the packet character parameter in the simulation packet, so as to prevent the device identity from interfering on the process of the first VTEP calculating the UDP source port number according to the packet character parameter.

In the first mode, the process of the first VTEP receiving from the controller the simulation packet for simulating the service forwarding path of the service packet forwarded from the first VM to the second VM includes that:

each member device in the first VTEP receives from the controller the simulation packet for simulating the service forwarding path of the service packet forwarded from the first VM to the second VM and containing the device identity of the member device.

When each member device in the first VTEP receives the simulation packet for simulating the service forwarding path of the service packet forwarded from the first VM to the second VM and containing the device identity of the member device, block 202 shown in FIG. 1 is performed. In the first mode, the controller sends the same register entry matching with the simulation packet to each member device in the first VTEP.

A second mode may be applicable to a scenario in which member devices in the stack device study a source MAC address at a local member port.

In the second mode, the controller sends a setting packet to each member device in the first VTEP, and the setting packet contains the simulation packet for simulating the service forwarding path of the service packet forwarded from the first VM to the second VM. In the second mode, the source MAC address of the setting packet is the MAC address of the first VM, and the simulation packet contained in the setting packet does not contain the device identity of the member device but contains the packet character parameter. For example, the first VTEP includes member devices 1-3, and in the second mode, the controller sends the same setting packet to the member devices 1-3. The source MAC address of the setting packet is the MAC address of the first VM, and the simulation packet contained in the setting packet contains the packet character parameter.

In the second mode, the process of the first VTEP receiving from the controller the simulation packet for simulating the service forwarding path of the service packet forwarded from the first VM to the second VM includes that:

each member device in the first VTEP receives from the controller the setting packet containing the simulation packet for simulating the service forwarding path of the service packet forwarded from the first VM to the second VM;

the member device in the first VTEP checks whether the source MAC address of the setting packet matches with a source MAC address studied by the member device, and if the source MAC address of the setting packet matches with the source MAC address studied by the member device, parses the setting packet and obtains the simulation packet for simulating the service forwarding path of the service packet forwarded from the first VM to the second VM. In the second mode, the simulation packet does not contain the device identity of the member device, and the member device matching with the source MAC address of the setting packet performs the flowchart shown in FIG. 1.

In some examples, no matter whether there is the controller in the VXLAN, the packet loss locating device may be the first VTEP.

In some examples, when the packet loss locating device is the first VTEP, the process of determining the simulation packet for simulating the service forwarding path of the service packet forwarded from the first VM to the second VM includes generating the simulation packet for simulating the service forwarding path of the service packet forwarded from the first VM to the second VM.

In some examples, when the packet loss locating device is the first VTEP, the local register entry matching with the simulation packet described at block 202 is generated by the first VTEP when the first VTEP determines that the service packet sent by the first VM does not reach the second VM.

In some examples, in order to distinguish from the service packet with the VXLAN encapsulation, the value of a designated reserved field in a VXLAN header in the simulation packet with the VXLAN encapsulation that is sent by the first VTEP is a setting value, for example, 100. In some examples, the designated reserved field is the first reserved field in the VXLAN header.

After the first VTEP sends the simulation packet with the VXLAN encapsulation, a device on the service forwarding path from the first VM to the second VM receives the simulation packet with the VXLAN encapsulation. The device receiving the simulation packet with the VXLAN encapsulation performs matching between the VXLAN encapsulation of the simulation packet and a local stored matching rule, and if the VXLAN encapsulation of the simulation packet matches with the local stored matching rule, sends to the packet loss locating device a packet loss locating parameter for determining the packet loss location of the service packet. The matching rule may be sent by the packet loss locating device, or may be configured in advance. In following two examples, the matching rule is sent by the packet loss locating device. According to the above mentioned VXLAN encapsulation, the matching rule may include that a UDP destination port number in an outer UDP header in the VXLAN encapsulation is a setting port number specified by a VXLAN protocol and the value of the designated reserved field in the VXLAN header is a setting value, for example, 100. In some examples, the designated reserved field is the first reserved field in the VXLAN header.

In some examples, the packet loss locating parameter sent by the device receiving the simulation packet with the VXLAN encapsulation contains a device identity of the device receiving the simulation packet with the VXLAN encapsulation. In some examples, the packet loss locating parameter may further contain an identity of a port receiving the simulation packet with the VXLAN encapsulation to locate the service forwarding path of the service packet.

In some examples, the device receiving the simulation packet with the VXLAN encapsulation is not the second VTEP accessed by the second VM. Since the simulation packet with the VXLAN encapsulation is sent when the service packet is lost, the simulation packet is usually unable to reach the second VTEP accessed by the second VM. Accordingly, besides sending the packet loss parameter to the packet loss locating device, the device receiving the simulation packet with the VXLAN encapsulation continues to determine a forwarding path according to a destination IP address in an outer IP header in the VXLAN encapsulation, and forwards the simulation packet with the VXLAN encapsulation. When determining, according to the destination IP address in the outer IP header in the VXLAN encapsulation, that there are multiple equivalent forward paths, the device receiving the simulation packet with the VXLAN encapsulation may perform a Hash operation according to the UDP source port number in the VXLAN encapsulation to determine a forwarding path and forwards the simulation packet with the VXLAN encapsulation via the determined forwarding path. In some examples, the simulation packet with the VXLAN encapsulation may reach the second VTEP accessed by the second VM. In some examples, in order to prevent the simulation packet with the VXLAN encapsulation from interfering on normal services, when the second VTEP receives the simulation packet with the VXLAN encapsulation, the second VTEP sends the packet loss locating parameter to the packet loss locating device, but does not forward the simulation packet with the VXLAN encapsulation, and discards the simulation packet with the VXLAN encapsulation. After the second VTEP receives the simulation packet with the VXLAN encapsulation, a processing scenario will be described as follows, for example, a scenario that the second VTEP loses a packet or a following processing scenario. The first VM sends N identical service packets to the second VM synchronously when accessing the second VM, wherein N is larger than 1, and M services packets reach the second VM, wherein M is smaller than N. In other words, N-M service packets do not reach the second VM. If the first VTEP determines N simulation packets according to the flowchart shown in FIG. 1, perform VXLAN encapsulation for the N simulation packets according to the local chip forwarding logic and forwards the N simulation packets with the VXLAN encapsulation, M simulation packets with the VXLAN encapsulation will reach the second VTEP, and the second VTEP discards the received simulation packets with the VXLAN encapsulation.

In some examples, no matter whether the packet loss locating device is the controller or the first VTEP, the device receiving the simulation packet with the VXLAN encapsulation sends the packet loss locating parameter to the packet loss locating device. When receiving the packet loss locating parameter, the packet loss locating device locates a packet loss device between the first VM and the second VM according to the packet loss locating parameter.

The process of locating the packet loss device between the first VM and the second VM according to the packet loss locating parameter may be implemented through following two modes.

In a mode a), the packet loss locating device locates the packet loss device between the first VM and the second VM according to the packet loss locating parameter when a preset packet loss locating period expires.

In the mode a), the process of locating the packet loss device between the first VM and the second VM according to the packet loss locating parameter includes:

checking whether the preset packet loss locating period expires, if the preset packet loss locating period expires, determining a last received packet loss locating parameter from all received packet loss locating parameters, and determines a device corresponding to a device identity in the last received packet loss locating parameter as the packet loss device.

In the mode a), the preset packet loss locating period may be set according to an actual condition, and is usually longer than a period of time for forwarding the simulation packet between two devices.

In a mode b), the packet loss locating device does not locate the packet loss device between the first VM and the second VM according to the packet loss locating parameter when the packet loss locating period expires, but locates the packet loss device along with the forwarding of the simulation packet.

In the mode b), the process of locating the packet loss device between the first VM and the second VM according to the packet loss locating parameter is implemented as follows.

Every time the packet loss locating device receives the packet loss locating parameter, the packet loss locating device takes the packet loss locating parameter as a current packet loss locating parameter, and determines time of receiving the current packet loss locating parameter. If the packet loss locating device receives the packet loss locating parameter again during a setting period after the determined time, the packet loss locating device returns to the operation of taking the packet loss locating parameter as the current packet loss locating parameter. If the packet loss locating device does not receive the packet loss locating parameter during the setting period after the determined time, the packet loss locating device determines a device corresponding to a device identity in the current packet loss locating parameter as the packet loss device.

In the mode b), the setting period is larger than the period of time for forwarding the simulation packet between two devices.

In some examples, regardless of the mode a) or the mode b), the packet loss device will be determined from devices between the first VTEP accessed by the first VM and the second VTEP accessed by the second VM.

In some examples, referring to the flowchart shown in FIG. 1, when a service packet sent by a VM does not reach another VM, a device losing the service packet during the forwarding process of the service packet can be determined rapidly through simulating a service forwarding path of the service packet. By the method, a packet loss location can be determined simply and rapidly, and workload can be reduced greatly.

A packet loss locating method applied to a VXLAN will be described hereinafter according to some examples.

Figure 2:
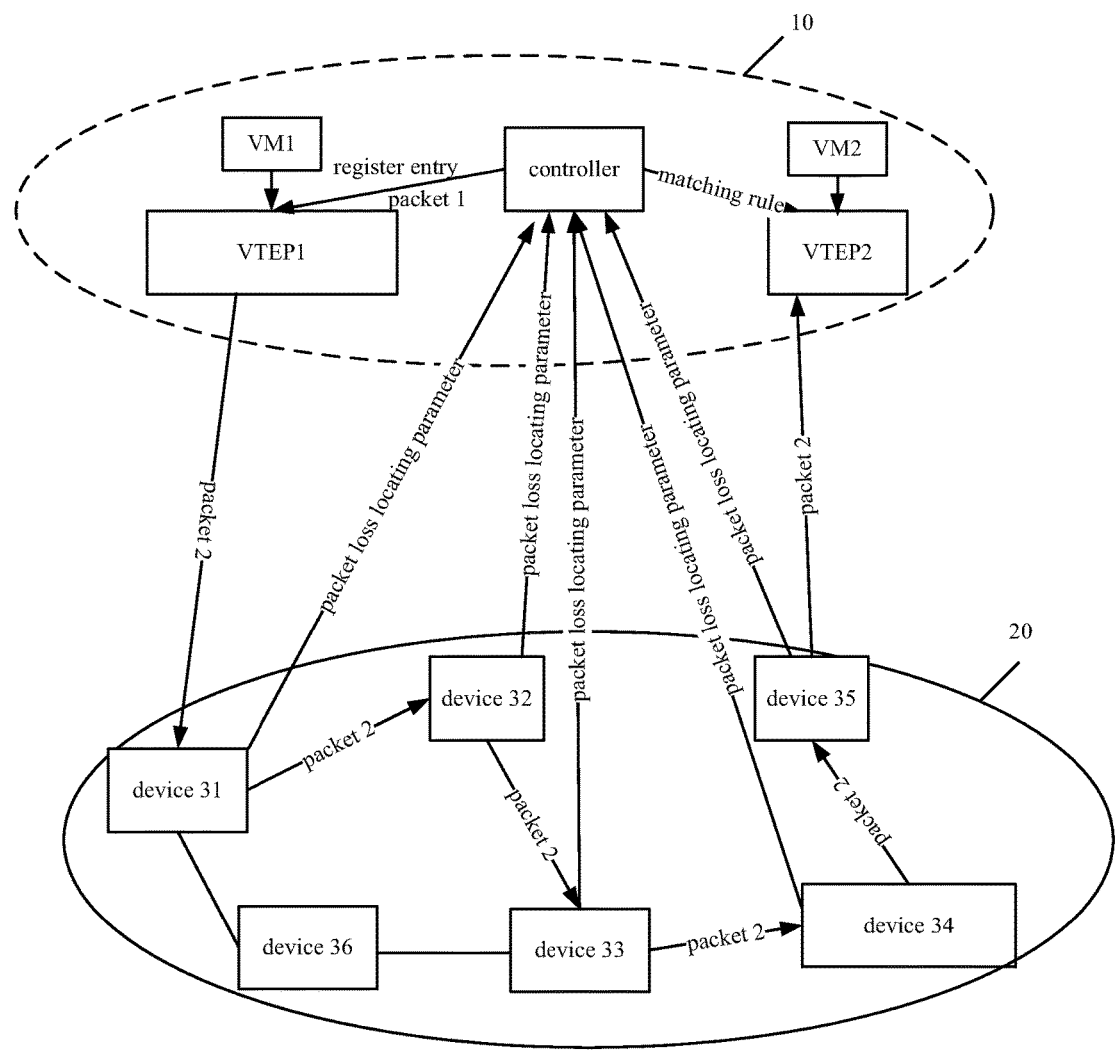
FIG. 2 is a diagram illustrating the structure of a network for implementing a packet loss locating method according to some examples of the present disclosure.

FIG. 2 is a diagram illustrating the structure of a network for implementing a packet loss locating method according to some examples of the present disclosure. As shown in FIG. 2, an overlay network 10 includes two VTEPs, represented as VTEP1 and VTEP2. VM1 is connected to the VTEP1, and VM2 is connected to the VTEP2. The VM1 and the VM2 are two virtual machines on two different servers. A controller manages the VTEP1 and the VTEP2. An underlay network 20 includes six devices, represented as devices 31-36. As shown in FIG. 2, a packet loss locating device is the controller.

In FIG. 2, suppose a service packet (represented as packet 0) sent by the VM1 does not reach the VM2, and the VTEP1 is a single device.

The controller creates a simulation packet (represented as packet 1) whose packet character parameter is the same as a packet character parameter of the packet 0, and sends the packet 1 to the VTEP1. The packet character parameter refers to the above description.

The controller generates a register entry matching with the packet 1, and sends the register entry to the VTEP1. The register entry may contain the packet character parameter of the packet 1, such as a source IP address, a destination IP address, an identity indicating that the packet 1 is a simulation packet and an identity of a VXLAN tunnel for forwarding the packet 0. In some examples, the identity of the VXLAN tunnel for forwarding the packet 0 is VXLAN tunnel 100.

The controller distributes a matching rule to the VTEP2 and devices (i.e., the devices 31-36) between the VTEP1 and the VTEP2. FIG. 2 does not show a route for sending the matching rule to the devices 31-35. The matching rule may include that the value of the first reserved field in a VXLAN header in VXLAN encapsulation is a setting value and a UDP destination port number in an outer UDP header in the VXLAN encapsulation is a setting VXLAN port number.

The VTEP1 receives the packet 1 sent by the controller, calculates the packet character parameter of the packet 1 according to a local chip forwarding logic to determine a UDP source port number, perform VXLAN encapsulation for the packet 1 according to the UDP source port number determined for the packet 1 and the VXLAN tunnel 100 in the register entry matching with the packet 1, and forwards the packet 1 with the VXLAN encapsulation via a VXLAN tunnel corresponding to the VXLAN tunnel 100. The difference between the VXLAN encapsulation of the packet 1 and the VXLAN encapsulation of the packet 0 lies in that the value of the first reserved field in the VXLAN header of the packet 1 is a setting value. A UDP source port number in the outer UDP header in the VXLAN encapsulation of the packet 1 is the determined UDP source port number of the packet 1, a UDP destination port number is a setting port number specified by a VXLAN protocol, an outer destination IP address in an outer IP header is the IP address of the VTEP2, and an outer source IP address is the IP address of the VTEP1. The packet 1 with the VXLAN encapsulation is called packet 2.

The device 31 receives the packet 2, finds that the value of the first reserved field in the VXLAN header in the VXLAN encapsulation of the packet 2 is a setting value and the destination UDP port number in the outer UDP header in the VXLAN encapsulation is a setting port number specified by the VXLAN protocol, which meets the matching rule distributed by the controller, and thus sends the packet loss locating parameter to the controller. The packet loss locating parameter includes the device identity of the device 31.

The device 31 determines a path to the outer destination IP address according to the outer destination IP address in the outer IP header in the VXLAN encapsulation of the packet 2, and finds that there are two equivalent paths including a path of device 31->device 32->device 33->device 34->device 35->VTEP2 and a path of device 31->device 36->device 33->device 34->device 35->VTEP2. Accordingly, the device 31 performs a Hash operation for the UDP source port number in the outer UDP header in the VXLAN encapsulation of the packet 2, and selects the path of the device 31->device 32->device 33->device 34->device 35->VTEP2 according to a Hash operation result to forward the packet 2.

The devices 32-35 may process the packet 2 using a similar processing method as that used by the device 31 after receiving the packet 2.

After receiving the packet 2, the VTEP2 finds that the value of the first reserved field in the VXLAN header in the VXLAN encapsulation of the packet 2 is a setting value and the UDP destination port number in the outer UDP header in the VXLAN encapsulation is a setting port number specified by the VXLAN protocol, which meets the matching rule distributed by the controller, and thus sends the packet loss locating parameter to the controller. If the VTEP2 finds that the outer destination IP address in the outer IP header in the VXLAN encapsulation is the IP address of the VTEP2, the VTEP2 discards the packet 2.

The controller collects all received packet loss locating parameters to locate the packet loss device. Referring to the mode a), a method of the controller locating the packet loss device will be described according to some examples.

For example, the packet loss locating parameters received by the controller includes (device 31), (device 32), (device 33) and (device 34).

Based on the mode a), the controller determines a last received packet loss locating parameter (i.e., device 34) from all received packet loss locating parameters when a setting packet loss locating period expires, and determines a device corresponding to the last received packet loss locating parameter (i.e., the device 34) as the packet loss device. Accordingly, the controller determines that the packet 0 is lost at the device 34.

Accordingly, the controller may locate the device losing the packet 0 through collecting all received packet loss locating parameters.

Figure 3:
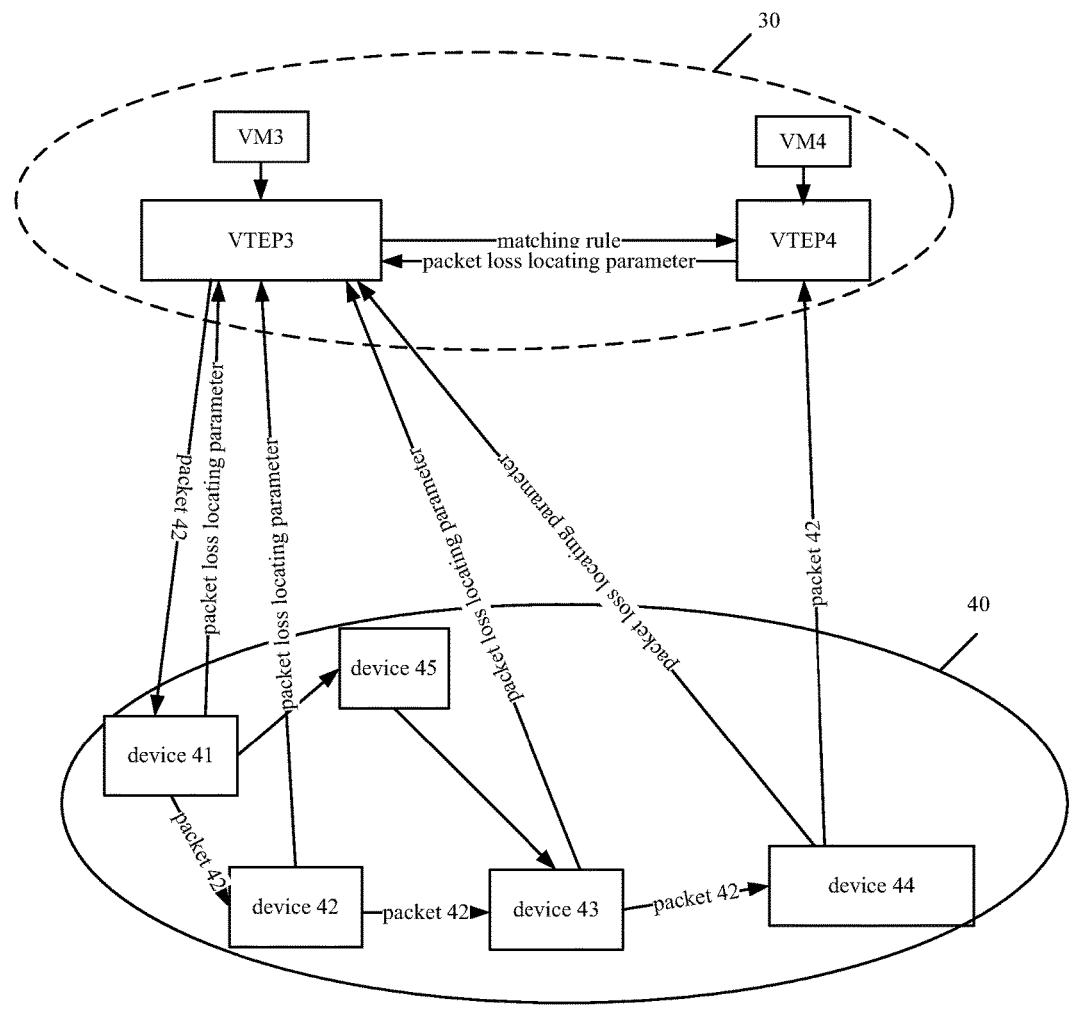
FIG. 3 is a diagram illustrating the structure of a network for implementing a packet loss locating method according to some examples of the present disclosure.

FIG. 3 is a diagram illustrating the structure of a network for implementing a packet loss locating method according to some examples of the present disclosure. As shown in FIG. 3, an overlay network 30 includes two VTEPs, represented as VTEP3 and VTEP4. VM3 is connected to the VTEP3, and VM4 is connected to the VTEP4. The VM3 and the VM4 are two virtual machines on two different servers. An underlay network 40 includes five devices, represented as devices 41-45. As shown in FIG. 3, a packet loss locating device is the VTEP3.

In FIG. 3, suppose a service packet (represented as packet 40) sent by the VM3 does not reach the VM4.

The VTEP3 creates a simulation packet (represented as packet 41) whose packet character parameter is the same as a packet character parameter of the packet 40. The packet character parameter refers to the above description.

The VTEP3 locally stores a register entry matching with the packet 41. The register entry may contain the packet character parameter of the packet 41, such as a source IP address, a destination IP address, an identity indicating that the packet 41 is a simulation packet and an identity of a VXLAN tunnel for forwarding the packet 40. In some examples, the identity of the VXLAN tunnel for forwarding the packet 40 is VXLAN tunnel 400.

The VTEP3 distributes a matching rule to the VTEP4 and devices (i.e., the devices 41-45) between the VTEP3 and the VTEP4.

The matching rule may include that the value of the first reserved field in a VXLAN header in VXLAN encapsulation is a setting value and a UDP destination port number in an outer UDP header in the VXLAN encapsulation is a setting VXLAN port number.

The VTEP3 calculates the packet character parameter of the packet 41 according to a local chip forwarding logic to determine a UDP source port number, performs VXLAN encapsulation for the packet 41 according to the UDP source port number determined for the packet 41 and the VXLAN tunnel 400 in the pre-configured local register entry matching with the packet 41, and forwards the packet 41 with the VXLAN encapsulation via a VXLAN tunnel corresponding to the VXLAN tunnel 400. The difference between the VXLAN encapsulation of the packet 41 and the VXLAN encapsulation of the packet 40 lies in that the value of the first reserved field in the VXLAN header of the packet 41 is a setting value. A UDP source port number in the outer UDP header in the VXLAN encapsulation of the packet 41 is the determined UDP source port number of the packet 41, a UDP destination port number is a setting port number specified by a VXLAN protocol, an outer destination IP address in an outer IP header is the IP address of the VTEP4, and an outer source IP address is the IP address of the VTEP3. The packet 41 with the VXLAN encapsulation is called packet 42.

The device 41 receives the packet 42, finds that the value of the first reserved field in the VXLAN header in the VXLAN encapsulation of the packet 42 is a setting value and the destination UDP port number in the outer UDP header in the VXLAN encapsulation is a setting port number specified by the VXLAN protocol, which meets the matching rule distributed by the VTEP3, and thus sends the packet loss parameter to the VTEP3. The packet loss parameter includes the device identity of the device 41.

The device 41 determines a path to the outer destination IP address according to the outer destination IP address in the outer IP header in the VXLAN encapsulation of the packet 42, and finds that there are two equivalent paths including a path of device 41->device 42->device 43->device 44->VTEP4 and a path of device 41->device 42->device 45->device 43->device 44->VTEP4. Accordingly, the device 41 performs a Hash operation for the UDP source port number in the outer UDP header in the VXLAN encapsulation of the packet 42, and selects the path of the device 41->device 42->device 43->device 44->VTEP4 according to a Hash operation result to forward the packet 42.

The devices 42-45 may process the packet 2 using a similar processing method as that used by the device 41 after receiving the packet 42.

After receiving the packet 42, the VTEP4 finds that the value of the first reserved field in the VXLAN header in the VXLAN encapsulation of the packet 42 is a setting value and the UDP destination port number in the outer UDP header in the VXLAN encapsulation is a setting port number specified by the VXLAN protocol, which meets the matching rule distributed by the VTEP3, and thus sends the packet loss locating parameter to the VTEP3. If the VTEP4 finds that the outer destination IP address in the outer IP header in the VXLAN encapsulation is the IP address of the VTEP4, the VTEP4 discards the packet 42.

The VTEP3 locates the packet loss device according to all received packet loss locating parameters. Referring to the mode b), a method of the VTEP3 locating the packet loss device will be described according to some examples.

For example, the VTEP3 receives the packet loss locating parameter sent by the device 41, takes the packet loss locating parameter sent by the device 41 as a current packet loss locating parameter, determines that time of receiving the current packet loss locating parameter is T1, and checks whether the packet loss locating parameter is received again during a setting period (e.g., 100 ms) after T1. If the VTEP3 receives the packet loss locating parameter sent by the device 42 again during the setting period after T1, the VTEP3 takes the packet loss locating parameter sent by the device 42 as the current packet loss locating parameter, determines that time of receiving the current packet loss locating parameter is T2, and checks whether the VTEP3 receives the packet loss locating parameter again during a setting period (e.g., 100 ms) after T2. If the VTEP3 receives the packet loss locating parameter sent by the device 43 again during the setting period after T2, the VTEP3 takes the packet loss locating parameter sent by the device 43 as the current packet loss locating parameter, determines that time of receiving the current packet loss locating parameter is T3, and checks whether the VTEP3 receives the packet loss locating parameter again during a setting period (e.g., 100 ms) after T3. If the VTEP3 does not receive the packet loss locating parameter again during the setting period after T3, the VTEP3 determines the device 43 as the packet loss device, and thus determines that the packet 40 is lost at the device 43.

The foregoing is the method for locating packet loss provided the by some examples of the present disclosure, and an apparatus for locating packet loss will be described hereinafter according to some examples.

Figure 4:
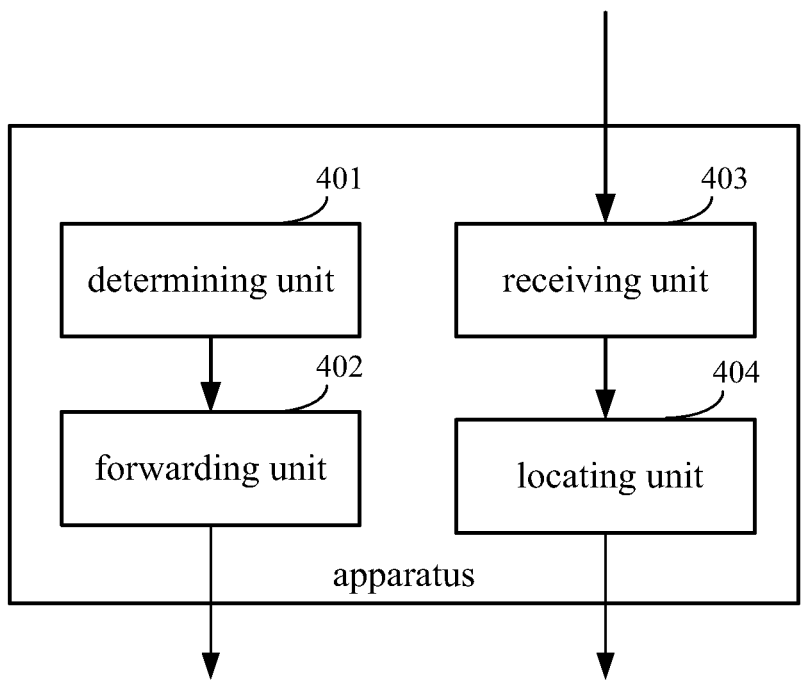
FIG. 4 is a diagram illustrating the structure of a packet loss locating apparatus applied to a VXLAN according to some examples of the present disclosure.

FIG. 4 is a diagram illustrating the structure of a packet loss locating apparatus applied to a VXLAN according to some examples of the present disclosure. The apparatus may be applicable to a first VTEP. As shown in FIG. 4, the apparatus includes a determining unit 401 and a forwarding unit 402.

The determining unit 401 may determine a simulation packet for simulating a service forwarding path of a service packet forwarded from a first VM accessing the first VTEP to a second VM accessing a second VTEP when the service packet sent by the first VM does not reach the second VM. In some examples, a packet character parameter of the simulation packet is the same as a packet character parameter of the service packet.

The forwarding unit 402 may calculate the packet character parameter of the simulation packet according to a local chip forwarding logic of the first VTEP to determine a UDP source port number, perform VXLAN encapsulation for the simulation packet according to the determined UDP source port number and a VXLAN tunnel identity in a local register entry matching with the simulation packet, and forward the simulation packet with the VXLAN encapsulation via a VXLAN tunnel corresponding to the VXLAN tunnel identity, so that a device receiving the simulation packet with the VXLAN encapsulation sends to a packet loss locating device a packet loss locating parameter for determining a packet loss location of the service packet by the packet loss locating device.

In some examples, when the packet loss locating device is a controller for managing VTEPs in the VXLAN, the determining unit 401 may determine the simulation packet for simulating the service forwarding path of the service packet forwarded from the first VM to the second VM through a process of receiving from the controller the simulation packet for simulating the service forwarding path of the service packet forwarded from the first VM to the second VM.

In some examples, when the packet loss locating device is the first VTEP, the determining unit 401 may determine the simulation packet for simulating the service forwarding path of the service packet forwarded from the first VM to the second VM through a process of generating the simulation packet for simulating the service forwarding path of the service packet forwarded from the first VM to the second VM.

In some examples, the VXLAN tunnel identity in the register entry matching with the simulation packet is a VXLAN tunnel identity corresponding to a VXLAN tunnel via which the first VTEP sends the service packet.

In some examples, when the packet loss locating device is the controller for managing VTEPs in the VXLAN, the local register entry matching with the simulation packet is generated and sent to the first VTEP by the controller when the controller determines that the service packet sent by the first VM does not reach the second VM.

In some examples, when the packet loss locating device is the first VTEP, the local register entry matching with the simulation packet is generated by the first VTEP when the first VTEP determines that the service packet sent by the first VM does not reach the second VM.

In some examples, when the packet loss locating device is the first VTEP, as shown in FIG. 4, the apparatus further includes:

a receiving unit 403, to receive the packet loss locating parameter sent by the device receiving the simulation packet with the VXLAN encapsulation, wherein the packet loss locating parameter contains a device identity of the device receiving the simulation packet with the VXLAN encapsulation; and a locating unit 404, to determine the packet loss device between the first VM and the second VM according to the received packet loss locating parameter.

In some examples, when the packet loss locating device is the controller for managing VTEPs in the VXLAN and the first VTEP is a stack device aggregated across devices, the determining unit 401 may receive from the controller the simulation packet for simulating the service forwarding path of the service packet forwarded from the first VM to the second VM through a process of:

receiving from the controller the simulation packet for simulating the service forwarding path of the service packet forwarded from the first VM to the second VM, wherein the simulation packet contains a device identity of a member device in the first VTEP and a location of the device identity in the simulation packet is different from a location of the packet character parameter in the simulation packet; or receiving from the controller a setting packet containing the simulation packet for simulating the service forwarding path of the service packet forwarded from the first VM to the second VM, wherein a source MAC address of the setting packet is a MAC address of the first VM; and checking whether the source MAC address of the setting packet matches with a source MAC address studied by a member device in the first VTEP, and when the source MAC address of the setting packet matches with the source MAC address studied by the member device, parsing the setting packet to obtain the simulation packet for simulating the service forwarding path of the service packet forwarded from the first VM to the second VM.

Figure 5:
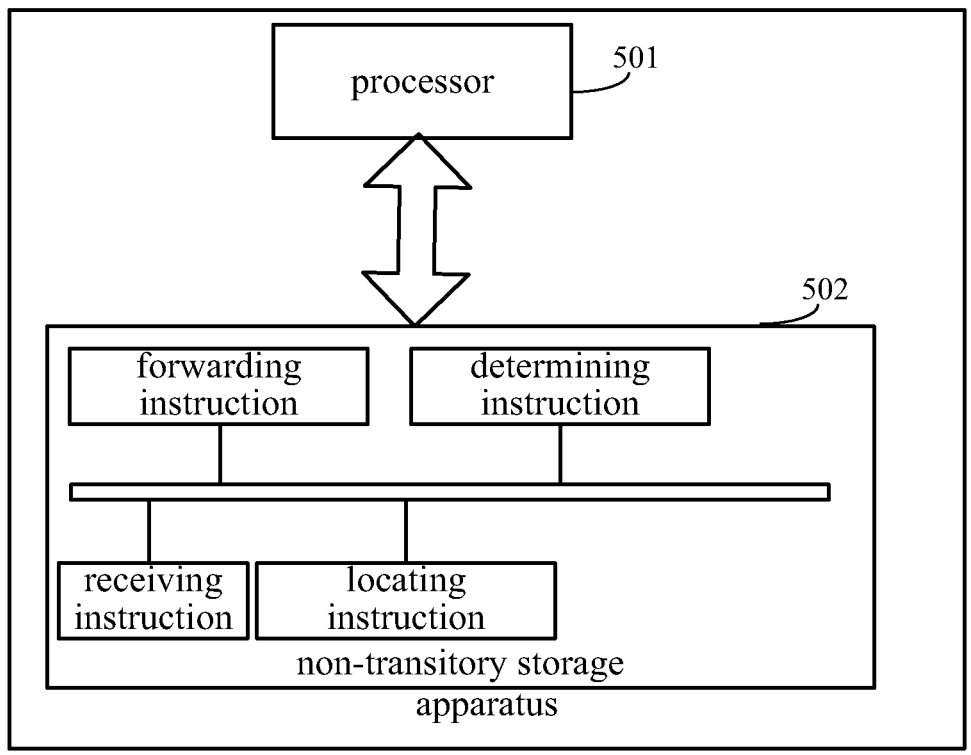
FIG. 5 is a diagram illustrating the hardware structure of a packet loss locating apparatus applied to a VXLAN according to some examples of the present disclosure.

Some examples of the present disclosure also provide a hardware structure of the apparatus shown in FIG. 4. FIG. 5 is a diagram illustrating the hardware structure of a packet loss locating apparatus applied to a VXLAN according to some examples of the present disclosure. The apparatus is a first VTEP.

As shown in FIG. 5, the apparatus includes a processor 501, for example, a CPU, and a non-transitory storage 502.

In some examples, the non-transitory storage 502 may store machine readable instructions, including a determining instruction and a forwarding instruction that can be executed by the processor 501.

In some examples, the processor 501, for example, the CPU, may read the determining instruction stored in the non-transitory storage 502 to perform a process of:

determining a simulation packet for simulating a service forwarding path of a service packet forwarded from a first VM accessing the first VTEP to a second VM accessing a second VTEP when the service packet sent by the first VM does not reach the second VM, and a packet character parameter of the simulation packet being the same as a packet character parameter of the service packet.

In some examples, the processor 501 may read the forwarding instruction stored in the non-transitory storage 502 to perform a process of:

calculating the packet character parameter of the simulation packet according to a local chip forwarding logic to determine a UDP source port number, performs VXLAN encapsulation for the simulation packet according to the determined UDP source port number and a VXLAN tunnel identity in a local register entry matching with the simulation packet, and forwards the simulation packet with the VXLAN encapsulation via a VXLAN tunnel corresponding to the VXLAN tunnel identity, so that a device receiving the simulation packet with the VXLAN encapsulation sends to a packet loss locating device a packet loss locating parameter for determining a packet loss location of the service packet by the packet loss locating device.

In some examples, when the packet loss locating device is a controller for managing VTEPs in the VXLAN, the processor 501 reads the determining instruction stored in the non-transitory storage 502 to perform a process of:

receiving, from the controller, the simulation packet for simulating the service forwarding path of the service packet forwarded from the first VM to the second VM.

When the packet loss locating device is the first VTEP, the processor 501 reads the determining instruction stored in the non-transitory storage 502 to perform a process of:

generating the simulation packet for simulating the service forwarding path of the service packet forwarded from the first VM to the second VM.

In some examples, the VXLAN tunnel identity in the local register entry matching with the simulation packet is a VXLAN tunnel identity corresponding to a VXLAN tunnel via which the first VTEP sends the service packet.

When the packet loss locating device is a controller for managing VTEPs in the VXLAN, the local register entry matching with the simulation packet is generated and sent to the first VTEP by the controller when the controller determines that the service packet sent by the first VM does not reach the second VM.

When the packet loss locating device is the first VTEP, the local register entry matching with the simulation packet is generated by the first VTEP when the first VTEP determines that the service packet sent by the first VM does not reach the second VM.

In some examples, when the packet loss locating device is the first VTEP, the machine readable instructions further includes a receiving instruction and a locating instruction.

In some examples, the processor 501 may read the receiving instruction stored in the non-transitory storage 502 to perform a process of:

receiving the packet loss locating parameter sent by the device receiving the simulation packet with the VXLAN encapsulation, wherein the packet loss locating parameter includes a device identity of the device receiving the simulation packet with the VXLAN encapsulation; and In some examples, the processor 501 may read the locating instruction stored in the non-transitory storage 502 to perform a process of:

determining the packet loss device between the first VM and the second VM according to the received packet loss locating parameter.

In some examples, when the packet loss locating device is the controller for managing VTEPs in the VXLAN and the first VTEP is a stack device aggregated across devices, the processor 501 reads the determining instruction stored in the non-transitory storage 502 to perform a process of:

receiving, from the controller by each member device in the first VTEP, the simulation packet for simulating the service forwarding path of the service packet forwarded from the first VM to the second VM, wherein the simulation packet contains a device identity of the member device and a location of the device identity of the member device in the simulation packet is different from a location of the packet character parameter in the simulation packet; or receiving, from the controller by each member device in the first VTEP, a setting packet containing the simulation packet for simulating the service forwarding path of the service packet forwarded from the first VM to the second VM, wherein a source Media Access Control (MAC) address of the setting packet is a MAC address of the first VM; and checking whether the source MAC address of the setting packet matches with a source MAC address studied by the member device; when the source MAC address of the setting packet matches with a source MAC address studied by the member device; parsing the setting packet to obtain the simulation packet for simulating the service forwarding path of the service packet forwarded from the first VM to the second VM.

The foregoing are some examples of the present disclosure and are not used to limit the protection scope of the present disclosure. Any modification, equivalent substitution and improvement without departing from the spirit and principle of the present disclosure are within the protection scope of the present disclosure.

What is claimed is:

1. A method for locating loss of a service packet, the method being applied to a Virtual eXtensible Local Area Network Tunnel End Point (VTEP), comprising:
    obtaining a simulation packet for simulating a service forwarding path which routes a service packet from the VTEP to another VTEP; wherein the service packet, which is sent from a first Virtual Machine (VM) being accessed to the VTEP to a second VM being accessed to another VTEP, did not reach the second VM, and packet character parameters of the simulation packet are same as packet character parameters of the service packet;
    calculating an outer User Datagram Protocol (UDP) source port number on the packet character parameters of the simulation packet basis via a local chip forwarding logic;
    performing a Virtual eXtensible Local Area Network (VXLAN) encapsulation for the simulation packet based on the UDP source port number and a VXLAN tunnel identification which is stored in a local register entry; wherein, the local register entry matches with the simulation packet; a value of the first reserve field of a VXLAN header of the simulation packet is a set value;
    forwarding the simulation packet with the VXLAN encapsulation through the VXLAN tunnel corresponding to the VXLAN tunnel identification, so that each device on the service forwarding path which has received the simulation packet with the VXLAN encapsulation sends a packet loss locating parameter to a packet loss locating device, which determines a packet loss location on the service forwarding path based on a device identity in the last received packet loss locating parameter.

2. The method of claim 1, wherein, the packet loss locating device is a controller for managing VTEPs in the VXLAN, the obtaining a simulation packet for simulating a service forwarding path which routes the service packet from the VTEP to another VTEP comprises: receiving the simulation packet from the controller.

3. The method of claim 2,
    wherein, the local register entry is received from the controller, and the local resiter entry is generated by the controller in response to a determination that the service packet sent by the first VM did not reach the second VM.

4. The method of claim 1, further comprises: each
    packet loss locating parameter includes a device identity which is to identify one device on the service forwarding path receives the simulation packet with the VXLAN encapsulation.

5. The method of claim 2, wherein, the VTEP is a stack device aggregated across devices, the method further comprises:
    receiving, from the controller by each member device in the VTEP, the simulation packet for simulating which contains a device identity of the member device; wherein the device identity of the member device and the packet character parameter are in different locations of the simulation packet; or receiving, from the controller by each member device in the VTEP, a setting packet which contains the simulation packet, wherein a source Media Access Control (MAC) address of the setting packet is a MAC address of the first VM; and checking whether the source MAC address of the setting packet matches with a source MAC address studied by the member device; parsing the setting packet to obtain the simulation packet for simulating the service forwarding path of the service packet forwarded from the first VM to the second VM in response to a determination that the source MAC address of the setting packet matches with the source MAC address studied by the member device.

6. The method of claim 1, wherein, the packet loss locating device is the VTEP, the obtaining a simulation packet for simulating a service forwarding path which routes the service packet from the VTEP to another VTEP comprises: generating the simulation packet.

7. The method of claim 6, wherein, the local register entry is generated by the VTEP in response to a determination that the service packet sent by the first VM did not reach the second VM.

8. A packet loss locating apparatus for locating loss of a service packet, the packet loss locating apparatus being a Virtual eXtensible Local Area Network Tunnel End Point (VTEP) wherein the packet loss locating apparatus comprises a non-transitory storage and a processor;

the non-transitory storage is to store machine readable instructions executed by the processor;

the processor is to read the machine readable instructions stored in the non-transitory storage to perform a process of:

obtaining a simulation packet for simulating a service forwarding path which routes a service packet from the VTEP to another VTEP; wherein the service packet, which is sent from a first Virtual Machine (VM) being accessed to the VTEP to a second VM being accessed to another VTEP, did not reach the second VM, and packet character parameters of the simulation packet are same as packet character parameters of the service packet;

calculating an outer User Datagram Protocol (UDP), source port number on the packet character parameters of the simulation packet basis via a local chip forwarding logic;

performing a Virtual eXtensible Local Area Network (VXLAN) encapsulation for the simulation packet based on the UDP source port number and a VXLAN tunnel identification which is stored in a local register entry; wherein, the local register entry matches with the simulation packet; a value of the first reserve field of a VXLAN header of the simulation packet is a set value;

forwarding the simulation packet with the VXLAN encapsulation through the VXLAN tunnel corresponding to the VXLAN tunnel identification, so that each device on the service forwarding path which has received the simulation packet with the VXLAN encapsulation sends a packet loss locating parameter to a packet loss locating device, which determines a packet loss location on the service forwarding path based on a device identity in the last received packet loss locating parameter.

9. The apparatus of claim 8, wherein, the packet loss locating device is a controller for managing VTEPs in the VXLAN, the processor reads the machine readable instructions stored in the non-transitory storage to perform a process of:

receiving the simulation packet from the controller.

10. The apparatus of claim 8, wherein the local register entry is received from the controller, and the local register entry is generated by the controller in response to a determination that the service packet sent by the first VM did not reach the second VM.

11. The apparatus of claim 8, wherein, each packet loss locating parameter includes a device identity which is to identify one device on the service forwarding path receives the simulation packet with the VXLAN encapsulation.

12. The apparatus of claim 9, wherein, the VTEP is a stack device aggregated across devices, the processor reads the machine readable instructions stored in the non-transitory storage to perform a process of:

receiving, from the controller by each member device in the VTEP, the simulation packet which contains a device identity of the member device; wherein the device identity of the member device and the packet character parameter are in different location of the simulation packet; or receiving, from the controller by each member device in the VTEP, a setting packet which contains the simulation packet, wherein a source Media Access Control (MAC) address of the setting packet is a MAC address of the first VM; and checking whether the source MAC address of the setting packet matches with a source MAC address studied by the member device; parsing the setting packet to obtain the simulation packet for simulating the service forwarding path of the service packet forwarded from the first VM to the second VM in response to a determination that the source MAC address of the setting packet matches with the source MAC address studied by the member device.

13. The apparatus of claim 8, wherein, the packet loss locating device is the VTEP, the processor reads the machine readable instructions stored in the non-transitory storage to perform a process of:

generating the simulation packet.

14. The apparatus of claim 13, wherein, the local register entry is generated by the VTEP in response to a determination that the service packet sent by the first VM did not reach the second VM.

* * * * *